United States Patent [19]
Takase

[11] 3,890,059
[45] June 17, 1975

[54] HYDRAULIC TURBINE OPERATING METHOD AND APPARATUS

[75] Inventor: Mituo Takase, Mito, Japan

[73] Assignee: Hitachi, Ltd., Japan

[22] Filed: Oct. 23, 1973

[21] Appl. No.: 408,260

[30] Foreign Application Priority Data
Oct. 25, 1972 Japan............................ 47-106287
Mar. 7, 1973 Japan.............................. 48-26034

[52] U.S. Cl. .................... 415/1; 415/106; 415/500
[51] Int. Cl. ............................................ F01d 17/00
[58] Field of Search ........ 415/1, 106, 107, 169, 500

[56] References Cited
UNITED STATES PATENTS

| | | | |
|---|---|---|---|
| 3,237,565 | 3/1966 | Hartland | 415/1 |
| 3,239,193 | 3/1966 | Kerensky | 415/169 |
| 3,330,532 | 7/1967 | Willi | 415/106 |
| 3,370,828 | 2/1968 | Willi | 415/107 |
| 3,398,696 | 8/1968 | Sproule | 415/1 |
| 3,463,453 | 8/1969 | Piguet | 415/169 |
| 3,533,709 | 10/1970 | Willi | 415/1 |

*Primary Examiner*—C. J. Husar
*Attorney, Agent, or Firm*—Craig & Antonelli

[57] ABSTRACT

A device whereby when the hydraulic turbine operating pattern is switched from normal to spinning reserve or from spinning reserve to normal running without stopping rotation of the turbine runner, the thrust produced by water pressure acting to the runner is adjusted by the proper operation of a leak water discharging valve, exhaust valve and such.

7 Claims, 4 Drawing Figures

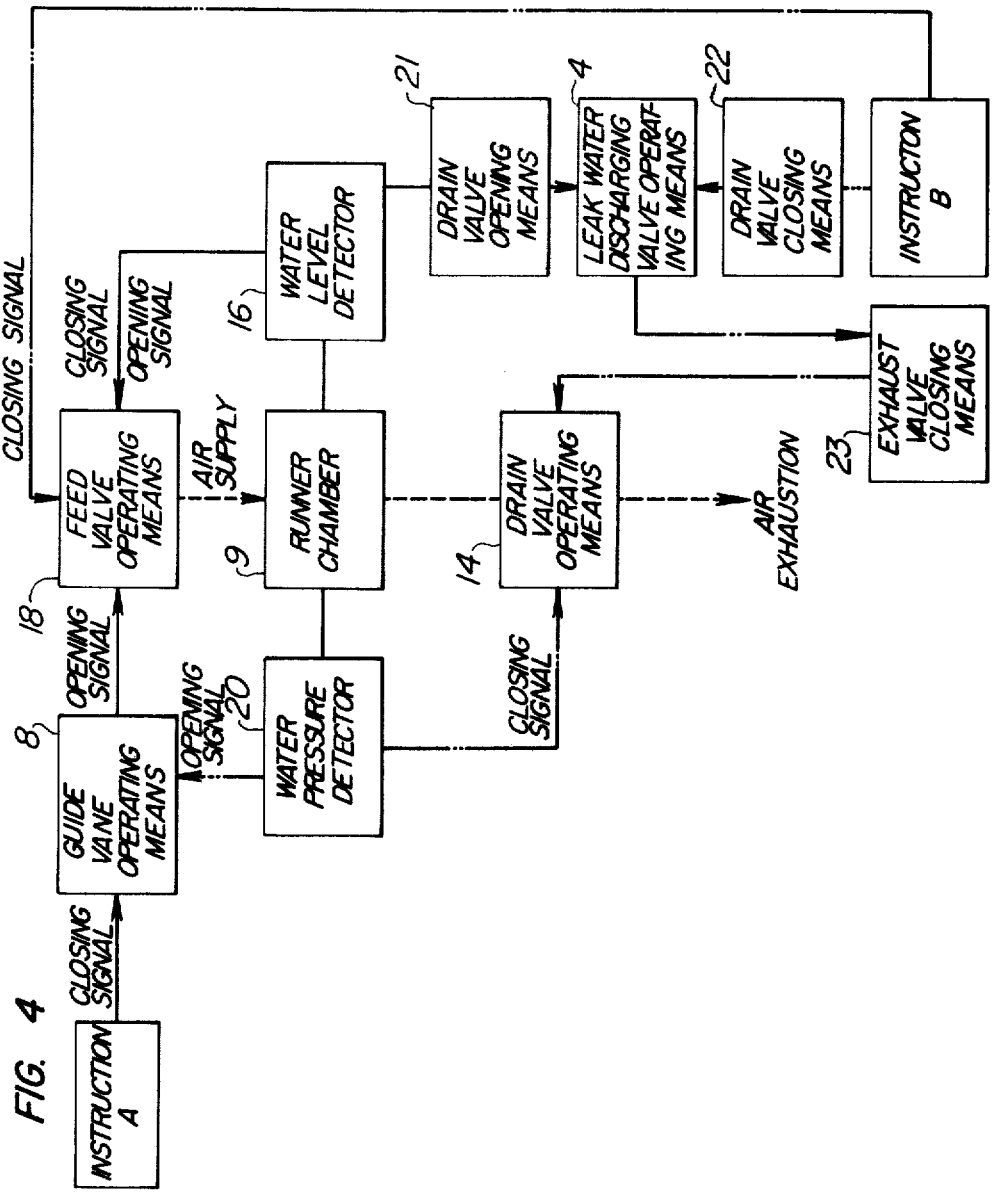

HYDRAULIC TURBINE OPERATING METHOD AND APPARATUS

FIELD OF THE INVENTION

This invention relates to a hydraulic turbine operating method and apparatus allowing smooth switchover of the running patterns of the turbine.

DESCRIPTION OF PRIOR ART

Among the essential component parts of a hydraulic turbine are a runner which receives energy from running water during the power-generating operation and gives energy to water during the pumping-up operation, a generator-motor which is directly connected to said runner by a shaft which is rotated with the runner to generate power or which rotates the runner during the pumping-up operation, a thrust bearing adapted to bear weights of said runner, said dynamotor and a shaft which connects them as well as hydraulic thrust to be described later, and guide vanes disposed around said runner for regulating the flow rate of water which passes therethrough. There are also provided air compressing means whereby air is compressed and fed into the runner chamber, an exhaust pipe whereby compressed air in said runner chamber is discharged out, said pipe having provided therein an exhaust valve, and a water discharge pipe whereby leak water from the guide vanes is discharged away, said pipe having provided therein a leak water discharging valve, but these elements are used in spinning reserve practiced in other time than normal power-generating or pumping-up operation.

The term "spinning reserve" as used here refers to a situation where the runner is rotated by a generator-motor in compressed air atmosphere in the runner chamber, and such pattern of operation is practiced for reducing initial torque of the generator-motor at starting of the pump operation, for producing a so-called stand-by condition which permits immediate switchover to a power-generating or pumping-up operation, or for improving power factor of the transmission system.

Therefore, the guide vanes provided around the runner are completely shut up for filling the runner chamber with compressed air, and water leakage from these guide vanes builds up resistance to runner rotation, so that it is essential to provide a leak water discharging valve.

Also, a runner crown chamber and a runner band chamber are defined between the upper and lower side, respectively, of the runner and a fixed part opposed to said runner. During normal running, a part of water passing through the runner enters said runner crown and runner band chambers to force corresponding movement of the runner in the vertical direction, but usually pressure in said runner crown chamber is greater and hence normally the runner receives a downwardly directed force, with such downward force being sustained by said thrust bearings, so that correct adjustment of pressures in both runner crown and runner band chambers becomes a key factor in aptly designing the capacity, size and strength of the thrust bearings.

As aforementioned, the hydraulic turbine running patterns include normal power-generating or pumping action and spinning reserve, and it is desirable that conversion of these running patterns from one to the other be effected without stopping the runner rotation for eliminating time loss.

However, during such switchover of the operating patterns, since said supply and exhaust pipes, leak water discharging pipe and such are opened into the runner crown and runner band chambers (even if they are not directly opened into said chamber), such switchover operation exerts a great influence to pressure in said both chambers, with the result that downward or upward thrust may be increased in excess of a set value, causing burning or other kinds of damage to the thrust bearings.

Therefore, in effecting such switching of operations, it is desirable to define the scope of pressure variation (pressure difference) in said both chambers within the same range as in normal running by suitably controlling the valves provided in said supply and exhaust pipes, leak water discharging pipes, etc. However, in the conventional systems, no consideration has been paid to measures for controlling thrust that would be developed during such switching of operating patterns.

SUMMARY OF THE INVENTION

The object of the present invention is to provide a hydraulic turbine operating method and apparatus designed to minimize pressure variation in the runner crown and runner band chambers when practicing switchover from normal to spinning reserve or from spinning reserve to normal running.

According to the present invention, in order to accomplish the said object, means are provided for adjusting the thrust acting to the runner by suitably controlling the operating elements such as exhaust valve, leak water discharge valve, etc., which exert influence much or less to pressure in the runner crown and runner band chambers.

BRIEF DESCRIPTION OF THE DRAWINGS

FIG. 4 is a block diagram showing operating relation of the component elements of the hydraulic turbine.

DESCRIPTION OF PREFERRED EMBODIMENT

Figure 1:
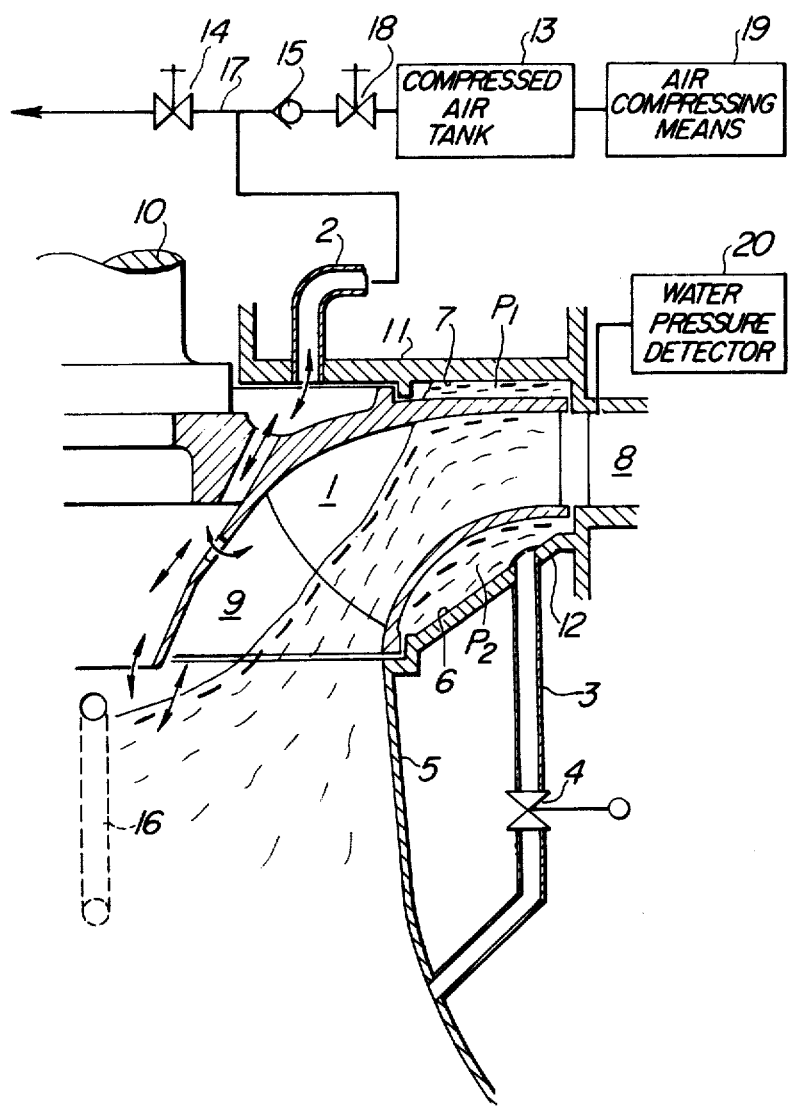
FIG. 1 is a side sectional view of the runner and the parts surrounding it, showing a condition in which switchover of the operating patterns of a hydraulic turbine is practiced.

FIGS. 1 to 4 show the modes of operation according to the operating method and apparatus of the present invention. In the figures, reference numeral 1 indicates a runner which is directly connected to a generator-motor (not shown) by a spindle 10. Numeral 2 designates an air supply and exhaust pipe having its one end opened into a cover provided in opposition to the upper surface of said runner 1, with the other end of said pipe 2 being connected to a compressed air tank 13 through a check valve 15 and an air supply valve 18. An exhaust pipe 17 branches off from said pipe 2, with an exhaust valve 14 being provided in said exhaust pipe 17. Numeral 3 refers to a leak water exhaust pipe provided with a leak water exhaust valve 4 (drain valve 4).

One end of said pipe 3 is opened into a runner band chamber 6 defined by the underside of said runner 1 and a lower cover 12 opposed thereto, with the other end being opened into a draft tube 5 provided below the runner 1.

Also in the drawings, numeral 7 designates a runner crown chamber defined by the upper surface of said runner 1 and said upper cover 11, 8 the guide vanes arranged around said runner 1, 9 a runner chamber defined by the upper and lower covers 11 and 12, 16 a water level detector for detecting the water level in said runner chamber 9, 19 an air compressing means whereby air is compressed and fed into said compressed air tank 13, 20 a pressure detector for detecting pressure in the runner chamber 9, 21 a drain valve opening means, 22 a drain valve closing means, and 23 an exhaust valve closing means.

Figure 3:
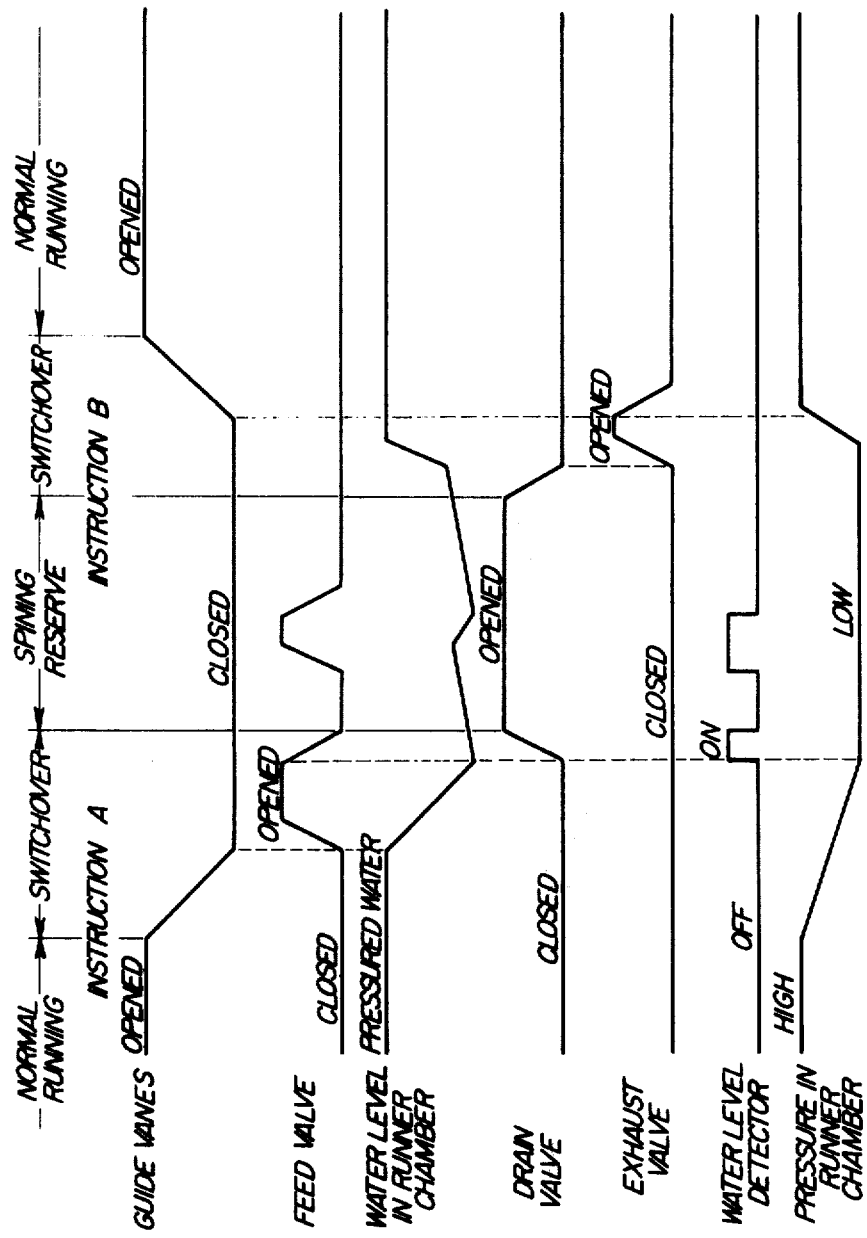
FIG. 3 is a diagram showing behaviors of the respective component elements of the hydraulic turbine when switchover is made from normal to spinning reserve or vice versa.

Now, the operation of the present device is described with particular reference to FIGS. 3 and 4.

During the normal power-generating or pumping-up operation, the runner chamber 9 is filled with flowing pressured water, and pressure in the runner crown and runner band chambers 7 and 6 is regulated by for instance a balance pipe (not shown) or by connecting them to a low pressure source, while axial thrust adjustment is made by adjusting the opening of the valve provided in said pipe. When an instruction A instructing transition from the above condition to spining reserve is issued, a guide vane closing signal is passed into the guide vane operating mechanism to close the guide vanes. As the guide vanes 8 are closed perfectly, an opening signal is sent to the air supply valve 18 to open it to allow feeding of compressed air into the runner chamber 9. Whereupon the water level in the runner chamber 9 begins to descend gradually, with water being removed from a part near the center of the runner as shown in FIG. 1, and the outer peripheral side of the runner is filled with pressured water. Pressured water also enters the runner crown chamber 7 and runner band chamber 6, so that the axial thrust acting to the runner remains unchanged from that in normal running.

Figure 2:
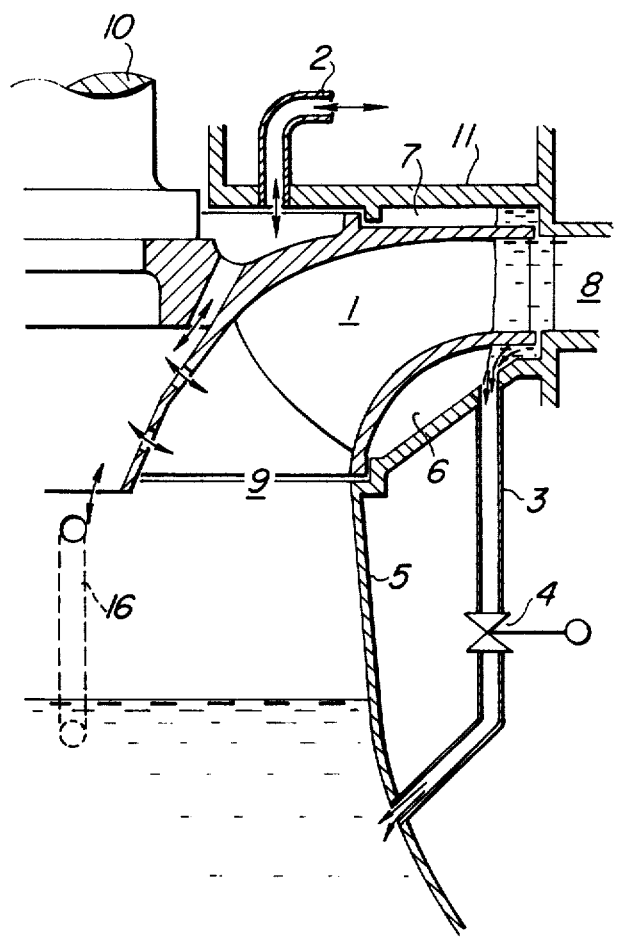
FIG. 2 is a side sectional view of the runner and its surrounding parts showing a condition in normal running of the hydraulic turbine.

As air supply is further continued and the water level drops down to a certain set level as shown in FIG. 2, the water level detector 16 operates to send a valve opening signal to the drain valve 4 through the drain valve opening means to open said valve. At the same time, a valve closing signal is given to the air supply valve 18 to close said valve 18 to stop air supply. The air supply valve, however, does not always remain closed thereafter but is suitably opened and closed by the operation of said water level detector 16 so as to maintain the water surface in the runner chamber 9 at a fixed level.

When this stage is reached, spinning reserve starts, and in the course of this transition, rotation of the runner 1 is switched to motor operation. Of course, no such switching is required when effecting transition from the pumping operation to spinning reserve, because in such case the runner 1 is in the motor operating position from the beginning.

During spinning reserve, water leakage from said guide vanes 8 is forced against the outer periphery of the runner by centrifugal force developed by rotation of the runner 1, and such water is discharged into the draft tube 5 (low pressure section) through the leak water discharge pipe 3 which opens proximate said particular portion of the runner 1, thereby mitigating (reducing) resistance to rotation of the runner 1.

When an instruction B for switching the spinning reserve into normal running condition is issued, a valve closing signal is sent to the drain valve 4 through the drain valve closing means to close said valve while at the same time a valve closing signal is sent to the air supply valve 18 to close it. This air supply valve closing signal stops the air supply valve operation by the water level detector 16, so that thereafter there is no need of maintaining the water level in the runner chamber 9 at a prescribed level. Also, water leakage from the guide vanes 8 is gradually collected and reservoired in the outer peripheral portion of the runner 1.

Upon complete closure of the drain valve 4, the exhaust valve 14 begins to open, causing gradual rise of the water level in the runner chamber 9, and as the rising up water comes to contact the bottom end of the runner 1, it is moved toward the outer periphery of the runner 1 to again produce the situation of FIG. 1, where the pressure condition in the runner crown and runner band chambers 7 and 6 formed on the upper and lower sides of the runner 1 is same as in normal operation.

When the runner chamber 9 is filled with water to develop a sufficient pressure therein (as when the priming pressure allowing start of water pumping operation is established), an exhaust valve closing signal is sent to the exhaust valve 14 from the water pressure detector 20 via the exhaust valve closing means to close said valve 14 while at the same time an opening signal enters to guide vanes 8 to initiate opening behavior of said guide vanes 8.

When switching to the power-generating operation, there is no need of waiting for build-up of said priming pressure; the opening behavior of the guide vanes 8 may be started at an earlier period. It suffices to set the operating time (pressure) of the water pressure detector 20 separately for the pumping-up operation and for the power-generating operation. It is empirically ascertained that by the time when a pressure sufficient to allow such pumping or power-generating operation is detected, exhaustion of air in the runner chamber 9 is already completed, so that closure of the exhaust valve 14 at this stage gives no hindrance to the ensuring operations.

As the guide vanes 8 are thus opened to a prescribed extent, the normal running is started.

In the above-described embodiment of the invention, instructions for normal running and for spinning reserve are issued separately. This applies where normal running is switched to stand-by or capacitor operation (instruction A) or vice versa (instruction B). In case of switching from the power-generating operation to pumping-up operation, said instructions A and B are comprised in the flow of a series of operations. In such a case, the runner 1 is once stopped and then rotated backwardly by the motor.

According to the present invention, in switching from normal to spinning reserve, the drain valve 4 is opened as the water level in the runner chamber 9 drops to the set level, while in switching from spinning reserve to normal running, the exhaust valve 14 is opened after the drain valve 4 has been closed, so that even during such switching operation, the pressure condition in both runner crown chamber 7 and runner band chamber 6 is maintained substantially same as in normal running, and hence no appreciable thrust variation takes place as compared with the period of normal running. Therefore, safety of the thrust bearings and other hydraulic turbine component parts is greatly improved.

What is claimed is:

1. An method of operating a hydraulic turbine in which the operating pattern of the hydraulic turbine is switched from a normal running to a spinning reserve, the method comprising: supplying air into a runner chamber of the hydraulic turbine, discharging water leakage from guide vanes of the hydraulic turbine, and controlling the air supply and the discharging of water leakage so that the relation between thrusts on upper and lower sides of a runner of the hydraulic turbine will be substantially the same as that in the normal running condition.

2. An operating method according to claim 1, wherein the step of supplying air includes introducing compressed air into the runner chamber, and wherein the step of controlling the air supply and discharging of water leakage includes opening a drain valve to discharge leak water from the guide vanes when a water level in the runner chamber has reached a preset level to thereby arrest thrust variation between the upper and lower sides of the running during the switching operation.

3. A hydraulic turbine operating apparatus comprising a runner disposed in the runner chamber, guide vanes arranged around said runner, an air supply valve for feeding compressed air into said runner chamber, a water level detector means for detecting the water level in said runner chamber, a water pressure detector means for detecting water pressure around the runner, a drain valve for discharging leak water from said guide vanes an exhaust valve for releasing compressed air in said runner chamber, means for opening said drain valve when the water level in said runner chamber has dropped to a preset level during transition from normal running to spinning reserve, means for opening said exhaust valve after perfect closure of said drain valve when the operating pattern is switched from spinning reserve to normal running.

4. An operating method for an hydraulic turbine in which the operating pattern of the turbine is switched from a spinning reserve to a normal running, the method comprising: discharging air from a runner chamber of the hydraulic turbine, discharging water leakage from guide vanes of the hydraulic turbine, and controlling the discharging of the air and the discharging of the water leakage so that the relation between thrusts on upper and lower sides of a runner of the turbine will be substantially the same as that in the normal running condition.

5. An operating method according to claim 4, wherein the step of controlling the discharging of the air and discharging of the water leakage includes fully opening a drain valve to discharge leak water from the guide vanes, and then opening an exhaust valve to discharge air from the runner chamber to thereby arrest thrust variation between the upper and lower sides of the runner during the switching operation.

6. An operating method for an hydraulic turbine in which the operating pattern is switched from a normal running to a spinning reserve, the method comprising: closing guide vane means of the hydraulic turbine, supplying compressed air to a runner chamber means of the hydraulic turbine upon closing of the guide vane means, detecting the water level in the runner chamber means, opening a leak water drain valve means upon the water level in the runner chamber means reaching a predetermined level, and controlling the supplying of the compressed air to the runner chamber means in response to the water level to maintain said water level at the predetermined level.

7. An operating method for an hydraulic turbine in which the operating pattern is switched from a spinning reserve to a normal running, the method comprising: closing a leak water drain valve means for the hydraulic turbine, opening an exhaust valve means to permit the water level in a running chamber means of the turbine to rise to a predetermined level, detecting the water pressure in the running chamber means, closing the exhaust valve means in response to a predetermined detected water pressure, and initiating an opening of guide vane means of the hydraulic turbine upon closing of the exhaust valve means.

* * * * *

UNITED STATES PATENT OFFICE
CERTIFICATE OF CORRECTION

Patent No. 3,890,059     Dated June 17, 1975

Inventor(s) Takase

It is certified that error appears in the above-identified patent and that said Letters Patent are hereby corrected as shown below:

Check valve 15 in Figure 1 which is now illustrated

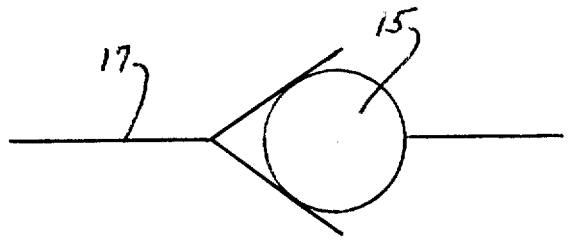

Should be illustrated as follows:

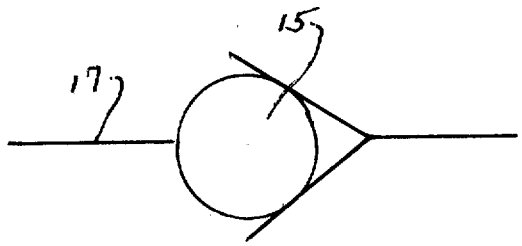

Signed and Sealed this

Twenty-fourth Day of October 1978

[SEAL]

Attest:

RUTH C. MASON
Attesting Officer

DONALD W. BANNER
Commissioner of Patents and Trademarks